United States Patent [19]

Silverthorn et al.

[11] Patent Number: 5,551,051

[45] Date of Patent: Aug. 27, 1996

[54] ISOLATED MULTIPROCESSING SYSTEM HAVING TRACKING CIRCUIT FOR VERIFYNG ONLY THAT THE PROCESSOR IS EXECUTING SET OF ENTRY INSTRUCTIONS UPON INITIATION OF THE SYSTEM CONTROLLER PROGRAM

[75] Inventors: Lee Silverthorn, Paradise Valley; Curtis Cornils; Mark L. Kirchner, both of Phoenix; Susan D. Stephens; Parker E. Crouse, both of Chandler, all of Ariz.

[73] Assignee: Motorola, Inc., Schaumburg, Ill.

[21] Appl. No.: 309,379

[22] Filed: Sep. 20, 1994

[51] Int. Cl.⁶ .......................... G06F 15/00; G06F 12/00; G06F 13/12

[52] U.S. Cl. ................. 395/800; 395/474; 395/185.01; 364/944.6; 364/945.4; 364/947.2; 364/960; 364/960.7; 364/975.2; 364/DIG. 2

[58] Field of Search ...................... 395/800, 700, 395/725, 775, 425, 400, 375, 474, 185.01; 364/DIG. 1, DIG. 2

[56] References Cited

U.S. PATENT DOCUMENTS

| | | | |
|---|---|---|---|
| 3,573,855 | 4/1971 | Cragon et al. | 395/425 |
| 3,827,029 | 7/1974 | Schlotterer et al. | 395/425 |
| 4,030,073 | 7/1977 | Armstrong, Jr. | 395/775 |
| 4,087,856 | 5/1978 | Attanasio | 395/700 |
| 4,298,934 | 11/1981 | Fischer | 395/425 |
| 4,716,586 | 12/1987 | Bauer | 380/3 |
| 4,729,091 | 3/1988 | Freeman et al. | 395/474 |
| 5,109,522 | 4/1992 | Lent et al. | 395/800 |
| 5,168,566 | 12/1992 | Kuki et al. | 395/650 |
| 5,237,616 | 8/1993 | Abraham et al. | 380/49 |
| 5,274,815 | 12/1993 | Trissel et al. | 395/700 |
| 5,341,497 | 8/1994 | Younger | 395/575 |
| 5,418,953 | 5/1995 | Hunt et al. | 395/650 |

*Primary Examiner*—Meng-Al An
*Attorney, Agent, or Firm*—Frederick M. Fliegel

[57] ABSTRACT

A computer (20) includes a hardware memory access enforcer (50) to insure that various independent programs (52, 54) operating on the computer (20) follow isolated processing rules. Each program has its own memory domain (56), which may extend across instruction, data, and I/O memory spaces (40, 42, 44). A system controller program (52) is a trusted process. The system controller (52) may access memory in the domain (56) of any application (54), and program flow may exit system controller (52) to any application (54). However, applications (54) cannot access memory outside of their own domains (56), and program flow may not exit applications (54) to enter other applications (54). Program flow may exit applications (54) to system controller (52) only if directed to an entry address (60). A tracking circuit (74) verifies that a microprocessor (22) actually executes entry instructions (94) located at the entry address (60).

26 Claims, 7 Drawing Sheets

FIG. 2
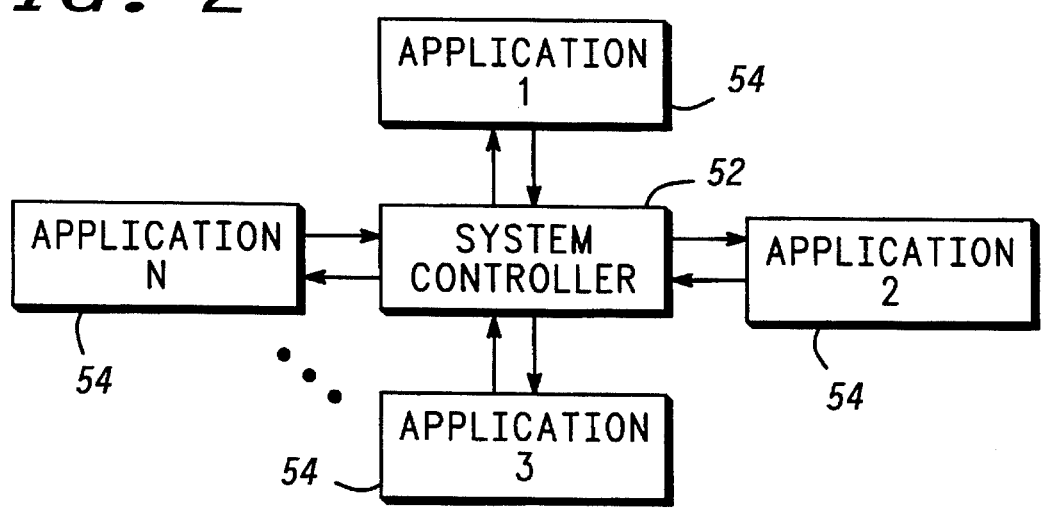
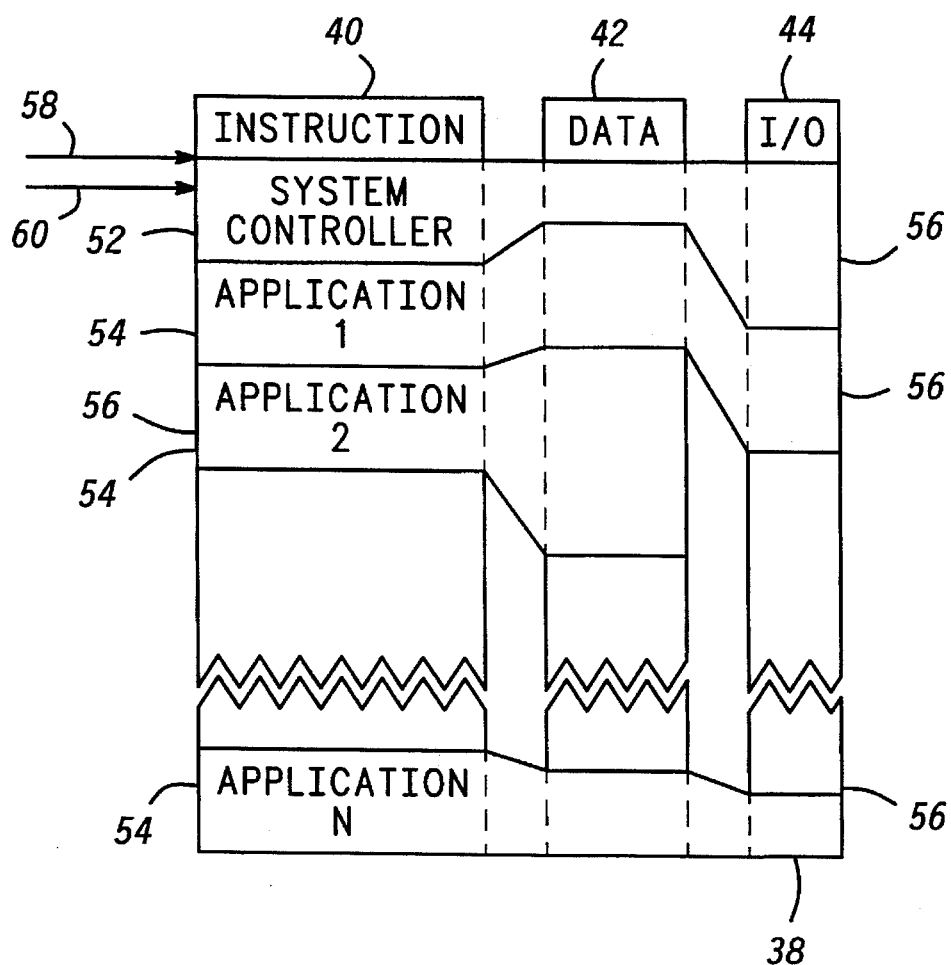
FIG. 3

FIG. 5

DOMAIN IDENTIFICATION — 62

- 76 — IF (ADDRESS=PERMANENT SC DOMAIN) THEN CURRENT DOMAIN=PERMANENT SC DOMAIN
- 78 — IF (ADDRESS≠PERMANENT SC DOMAIN) THEN CURRENT DOMAIN=(ADDRESSED DOMAIN REGISTER)
- 80 — IF (ACCESS=WRITE) AND (ADDRESS=DOMAIN REGISTER) THEN ADDRESSED DOMAIN REGISTER=DATA

FIG. 6

TRANSITION MONITOR REGISTER — 66

- 84 — IF (CURRENT DOMAIN≠SC DOMAIN) AND (RESET=FALSE) THEN PREVIOUS DOMAIN=LAST CURRENT DOMAIN ACCESS
- 86 — IF (CURRENT DOMAIN=SC DOMAIN) AND (RESET=FALSE) AND (TRACKER-ON=TRUE) THEN PREVIOUS DOMAIN=LAST CURRENT DOMAIN ACCESS
- 82 — IF (RESET=TRUE) THEN PREVIOUS DOMAIN=SC DOMAIN

FIG. 10

TRACKING CIRCUIT 74

120 IF (SC ENTRY=VALID) THEN TRACKER-ON=TRUE

122 IF (TRACKER ON=TRUE) AND (ACCESS=IFETCH) AND (IPIPE=FLUSHED) THEN ENTRY ERROR=TRUE

124 IF (ACCESS=WRITE) AND (ADDRESS=TRACKING CIRCUIT CONTROL FLAG) THEN TRACKER-ON=FALSE

FIG. 11

ERROR HANDLER 72

126 IF (DATA ERROR=TRUE) OR (ENTRY ERROR=TRUE) OR (TRANSITION ERROR=TRUE) THEN MAE RESET=TRUE

ISOLATED MULTIPROCESSING SYSTEM HAVING TRACKING CIRCUIT FOR VERIFYNG ONLY THAT THE PROCESSOR IS EXECUTING SET OF ENTRY INSTRUCTIONS UPON INITIATION OF THE SYSTEM CONTROLLER PROGRAM

LICENSE RIGHTS

The U.S. Government has a paid-up license in this invention and the right in limited circumstances to require the patent owner to license others on reasonable terms as provided for by the terms of Contract No. MDA904-92-C-A051 awarded by the United States National Security Agency.

TECHNICAL FIELD OF THE INVENTION

The present invention relates generally to computer architectures. More specifically, the present invention relates to computer architectures which restrict or monitor the processes being carried out by a computer's processor.

BACKGROUND OF THE INVENTION

When a computerized system experiences a software bug, a hardware failure, or sabotage, it may fail to do its intended job. This is an undesirable consequence which may lead to the loss of valuable data, unhappy customers, and perhaps an inability to charge for services being provided by the computer system. However, in some critical situations, it is much more than a mere undesirable consequence. For example, when a computer system is employed in a manner that affects health and safety, such as an airplane flight control system or medical equipment, human lives may be at stake. In addition, when a computer system may be employed to manage secure or otherwise confidential data, such as in connection with a secure communication system, a security breach may result. In these and other critical situations, a need exists to assure that a computer system actually does its intended or needed job.

Conventionally, providing assurances that a computerized system actually does its intended job has been a monumental problem. As the job a computer system does becomes more complex, so does the software which defines the job. As software complexity increases, the difficulty of the analyses needed to provide assurance that the computer system is doing what is intended likewise increases. In fact, the assurance problem increases exponentially with software complexity due to the exponentially increasing combinations of possible interactions between increasingly complicated software programs.

A known technique for managing the exponentially increasing difficulty of providing assurances for a complex software job is to break the entire job into isolated programs or processes, individually analyze each isolated program to assure a trusted status for the individual program, and then take steps to guarantee that the isolated programs remain isolated. Conventionally, computer systems have used multiple microprocessors to perform a corresponding number of isolated programs, and the multiple microprocessors communicate with each other only through highly constrained communication channels. In addition, the microprocessors are often used in simple architectures which may, for example, have little or no interrupting capabilities. The use of multiple microprocessors, simple architectures, and constrained communication channels limits the scope of interactions between the programs. The limited interactions between the programs allow the programs to be analyzed separately, which makes the assurance problem manageable.

However, the technique of using multiple microprocessors in simple architectures is an undesirable solution to the assurance problem. Multiple microprocessor computer systems tend to be expensive to manufacture, expensive to design, and inflexible. Moreover, this technique prevents the computer systems from exploiting advances in microprocessor designs.

Computer architectures are known which provide supervisor and user modes or privileged and unprivileged modes of operation. Typically, supervisor or privileged modes allow complete access to a computer system while user or unprivileged modes allow access to only restricted areas. These architectures typically address the problem of limiting damage which may be done by users or during unprivileged modes. They do not truly isolate programs so that their potential interactions remain manageable and assurances may be provided that the computer systems are operating as intended.

SUMMARY OF THE INVENTION

Accordingly, it is an advantage of the present invention that an improved isolated multiprocessing computer architecture and method are provided.

Another advantage of the present invention is that an architecture and method are provided that can be implemented using only a single processor.

Another advantage is that the present invention permits, but does not require, the use of more advanced microprocessor architectures that may include extensive interrupting capabilities.

Another advantage is that the present invention eases the problem of providing assurances that the computer system is operating as intended.

Another advantage is that the present invention sufficiently isolates programs so that different programs may be written in different languages, including the ADA programming language.

Another advantage is that different isolated programs running on a single processor do not need to be analyzed together to be assured that the programs are operating correctly.

The above and other advantages of the present invention are carried out in one form by a computer for performing isolated multiprocessing operations. The computer includes a memory allocated to a plurality of programs or processes. The programs include a system controller program and at least one application program. A processor is configured to access the memory at addresses specified by the processor and to execute instructions stored in the memory. The instructions include a set of entry instructions which the processor executes upon initiation of the system controller program. A tracking circuit couples to the processor. The tracking circuit is configured to verify that the processor actually executes the entry instructions.

BRIEF DESCRIPTION OF THE DRAWING

A more complete understanding of the present invention may be derived by referring to the detailed description and claims when considered in connection with the Figures, wherein like reference numbers refer to similar items throughout the Figures, and:

FIG. 2 is a state diagram depicting program flow between isolated programs in the computer;

FIG. 3 is a block diagram of a representative memory space map for the computer;

FIG. 5 shows logic equations defining the operation of a domain identification block of the memory access enforcer;

FIG. 6 shows logic equations defining the operation of a transition monitor register block of the memory access enforcer;

FIG. 10 shows logic equations defining the operation of a tracking circuit block of the memory access enforcer; and FIG. 11 shows a logic equation defining the operation of an error handler block of the memory access enforcer.

DETAILED DESCRIPTION OF THE DRAWING

Figure 1:
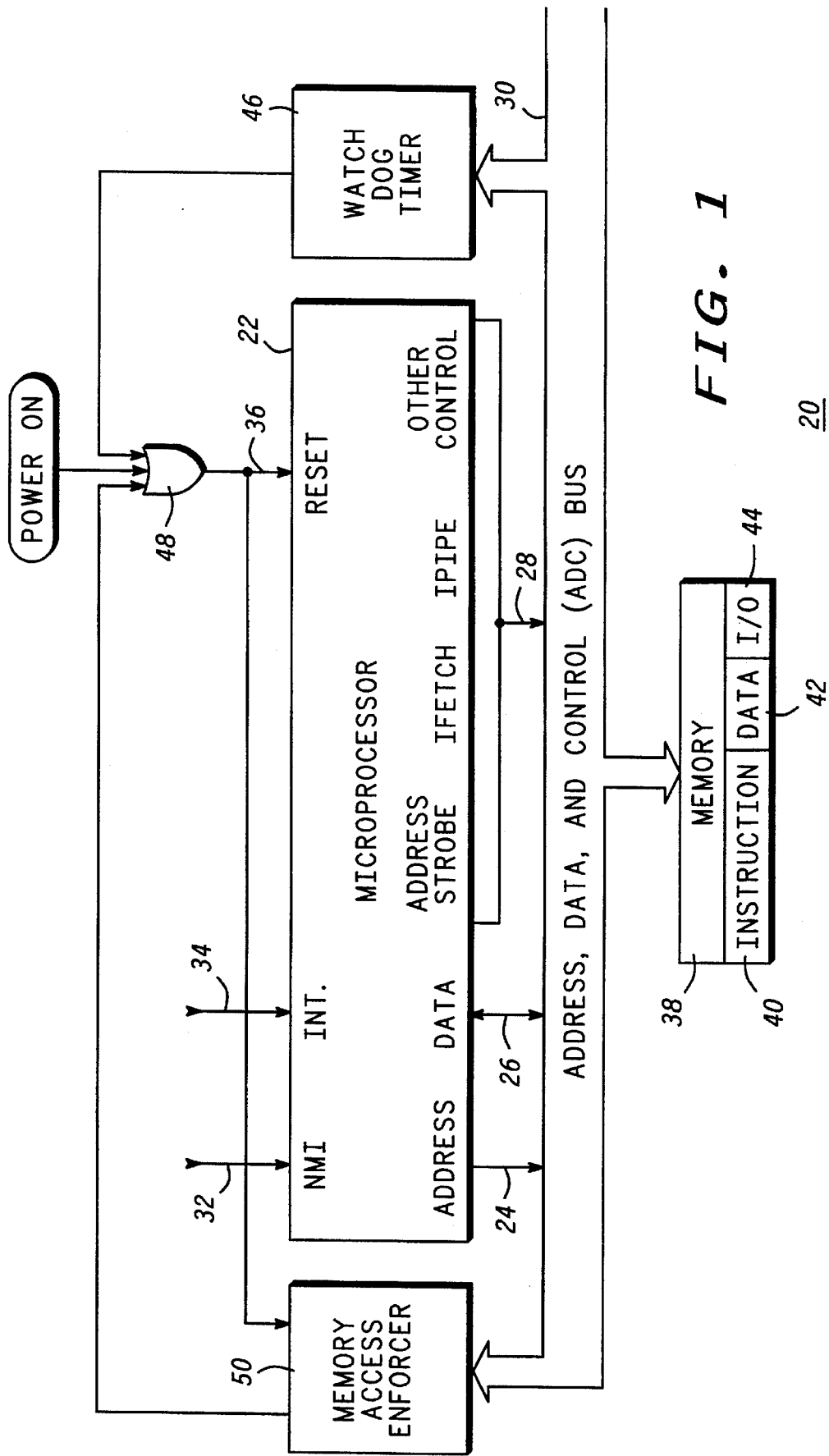
FIG. 1 is a block diagram of a computer configured in accordance with the description of the present invention.

FIG. 1 is a block diagram of computer 20 including microprocessor 22. The preferred embodiment uses a MC68340 microprocessor manufactured by Motorola Inc. of Phoenix Ariz., but this is not a requirement because many different microprocessors have similar features. These features include address lines 24, data lines 26 and control lines 28. Control lines 28 convey an address strobe signal, instruction fetch signal (IFETCH), instruction pipeline (IPIPE) signal, and other control signals. The other control signals include a read/write signal. Address lines 24, data lines 26 and control lines 28 are collectively referred to herein as an address, data and control (ADC) bus 30. Various control inputs to microprocessor 22 may control program flow and execution. These control inputs may include one or more of non-maskable interrupt (NMI) 32, normal hardware interrupts 34, reset 36 etc.

Address, data and control bus 30 couples to memory 38, which may be partitioned into instruction space 40, data space 42 and external input/output (I/O) space 44. However, these distinct types of memory spaces are not required by the present invention. Microprocessor 22 accesses memory 38 to read instructions, data or external inputs and to write data or external outputs. Memory accesses occur at addresses specified by microprocessor 22. In the preferred embodiment of the present invention, instruction space 40 is implemented in read only memory (ROM), to which data may not be written, but use of ROM for instruction space 40 is not a requirement. In addition, nothing in the present invention prevents the use of other devices, such as direct memory access (DMA) controllers which may also access memory 38. In the preferred embodiment of the present invention, the instructions for microprocessor 22 are specified via computer code written in the programming language ADA.

Watch dog timer 46 also couples to bus 30. While shown separately from memory 38 for convenience, timer 46 is actually included in memory 38 because it may be accessed by microprocessor 22 through operations at one or more memory addresses specified by microprocessor 22. An output from timer 46 couples through logic gate 48 to the microprocessor's reset input 36. Watch dog timer 46 operates like an alarm clock. When timer 46 alarms, it resets microprocessor 22. During normal operations, microprocessor 22 executes processes that keep pushing the alarm time farther and farther into the future so that no alarm occurs. However, if something happens and microprocessor 22 fails to push the alarm time out into the future, an alarm will occur and computer 20 will reset itself. While FIG. 1 illustrates watch dog timer 46 as being a separate entity from microprocessor 22, in other embodiments it may be incorporated in microprocessor 22.

Memory access enforcer (MAE) 50 couples to bus 30 and to reset 36. While shown separately from memory 38 for convenience, MAE 50 is actually included in memory 38 because it too may be accessed by microprocessor 22 through operations at one or more memory addresses specified by microprocessor 22. An output from MAE 50 also couples through logic gate 48 to the microprocessor's reset input 36. MAE 50 allows computer 20 to perform isolated multiprocessing. If a violation of isolated processing rules, discussed below, occurs, MAE 50 resets computer 20. Thus, computer 20 cannot operate in violation of the isolated processing rules.

FIG. 2 is a state diagram depicting the isolated processing rules and program flow in computer 20. Software executed by computer 20 is configured into a plurality of programs, including system controller program 52 and any number of application programs 54. Program 52 and each of programs 54 represents an independent process. Programs 52 and 54 are independent because each of programs 52 and 54 desirably assumes responsibility for its own processor initialization, including the saving and restoring of its complete processor state upon a transfer of control. However, nothing prevents various application programs 54 from cooperating with each other through the mailing of messages which are transferred by system controller program 52.

In addition, programs 52 and 54 are desirably configured as coroutines. Those skilled in the art will appreciate that coroutines differ from subroutines. A subroutine has a subordinate position relative to a main routine. A subroutine is called and then returns. Coroutines have a symmetric relation wherein each can call the other. Thus, a coroutine is resumed at a point immediately following its call of another coroutine. A coroutine never returns, but terminates its operation by calling (resuming) another coroutine.

FIG. 3 is a block diagram of memory 38 (FIG. 1). Memory 38 is partitioned so that particular domains 56 are assigned or otherwise associated with particular coroutines 52 and 54. This partitioning may extend across instruction, data and I/O spaces 40, 42 and 44, respectively. In the preferred embodiment, domain 56 for system controller program 52 is permanently assigned to system controller 52, but domains 56 for application programs 54 are all programmable and may be altered to accommodate different applications 54. Those skilled in the art will understand that a permanent assignment may be implemented through hardware and cannot be altered without changing the hardware, while a programmable assignment may be altered under the influence of software.

FIG. 3 also depicts addresses 58, 60 located in the domain for system controller 52. Addresses 58, 60 are associated with instruction space 40 and represent entry points into system controller program 52. In particular, address 58 is the location in memory 38 where the first instruction to be executed by microprocessor 22 after a reset (FIG. 1) is located. Address 60 is the location of the first instruction to be executed by microprocessor 22 upon the initiation of system controller 52 after exiting an application 54. Any convenient address within the domain of system controller 52 may serve as address 60.

Referring to FIGS. 2, 3, program flow may proceed to any of applications 54 only from system controller 52, and program flow may exit an application 54 only to system controller 52. Such exits from applications 54 to system controller 52 may take place only through address 60. Each application's data and I/O memory accesses are confined to that application's assigned domain 56. Program control may exit system controller 52 to any application 54, and system controller 52 may access any application's data and I/O domains 56 in addition to its own data and I/O domain 56. Even though each application 54 is being executed on a common microprocessor 22 (FIG. 1), it is isolated from the other applications 54.

If certain applications 54 need to communicate data with each other, the communication is accomplished by passing messages using mailboxes located in each application's domain. However, the messages are read from one application's mailbox and written to another application's mailbox by system controller 52. The messages are used to both pass data and specify which application 54 should next gain control of processor 22. An application 54 always transfers control indirectly to another application 54 through system controller 52. When system controller 52 gains control of processor 22, it uses a coroutine scheduling algorithm to subsequently pass control of processor 22 to the receiving application 54. As system controller 52 passes control, it reads the message from the source application's mailbox and performs applicable security and verification checks on the message data. System controller 52 then copies the message to the receiving application's domain and transfers control to that application 54 so that it can read and process its mail message.

Due to the isolated multiprocessing provided by computer 20, system controller 52 and applications 54 may be analyzed individually, rather than collectively, to be assured of acceptable operation of computer 20. This individual analysis feature eases development of projects for which computer 20 might be used. Furthermore, nothing requires all applications 54 to be analyzed for all projects. System controller 52 is desirably analyzed thoroughly so that it then serves as a trusted process. Beyond system controller 52, only those applications 54 which represent critical processes or programs, if any, undergo the thorough analysis required to provide assurance of acceptable, trusted operation. The isolated processing of computer 20 prevents non-critical processes from contaminating more critical processes.

In addition, nothing requires that all programs 52, 54 be written in a common language, share common libraries etc. Thus, applications 54 which may have been previously assured for other projects may be combined with other new or different applications 54 in computer 20 with little or no additional assurance analysis.

Figure 4:
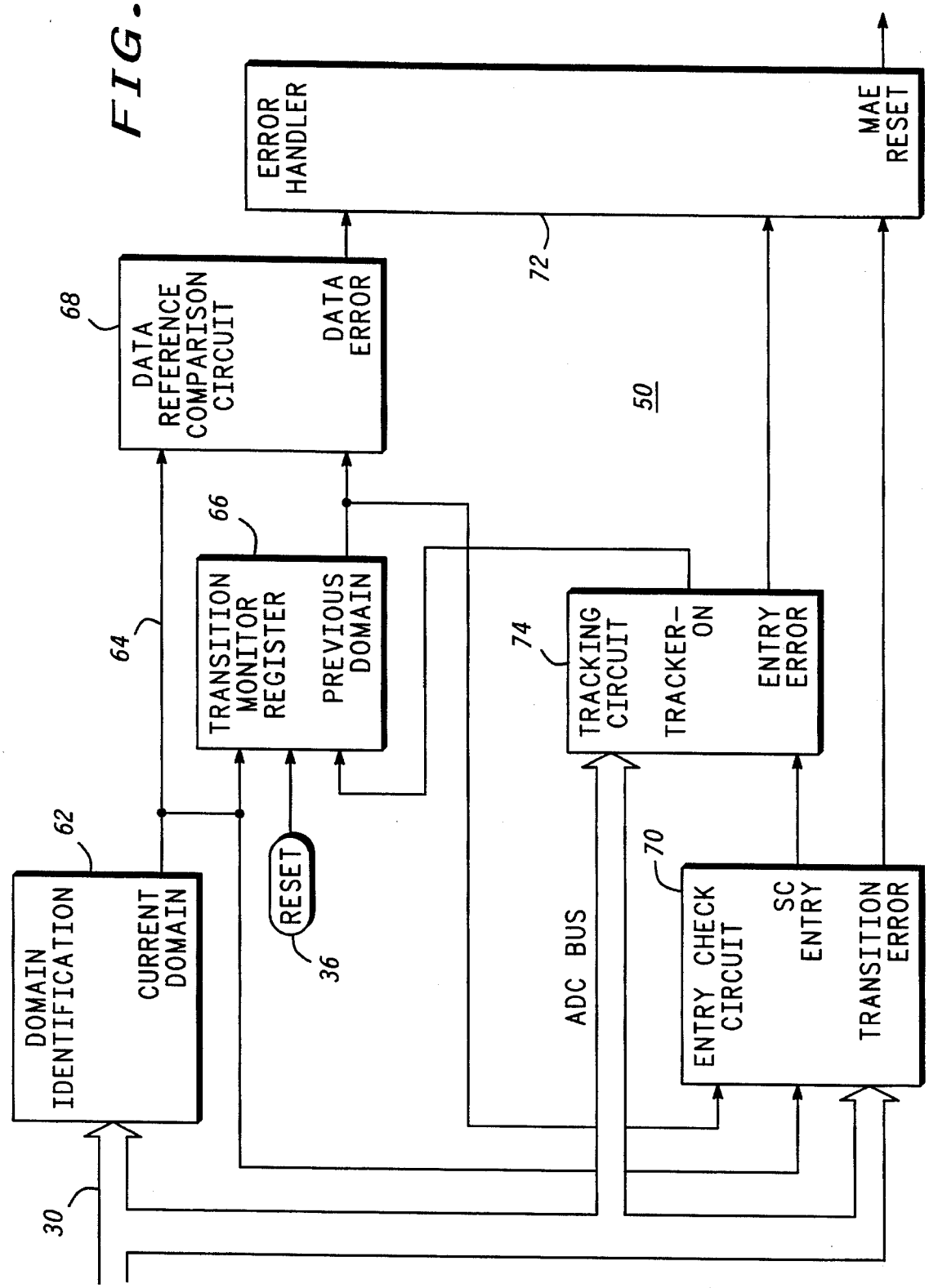
FIG. 4 is a block diagram of a memory access enforcer portion of the computer.

FIG. 4 is a block diagram of memory access enforcer (MAE) 50, including domain identification block 62 coupled to address, data and control (ADC) bus 30. Domain identification block 62 drives current access bus 64. Current access bus 64 couples to inputs of transition monitor register 66, data reference comparison circuit 68, and entry check circuit 70. Reset signal 36 from logic gate 48 (FIG. 1) also couples to an input of transition monitor 66. Transition monitor register 66 has a previous domain output coupled to data reference comparison circuit 68 and to entry check circuit 70. Data reference comparison circuit 68 has a data error output signal that couples to error handler 72. ADC bus 30 additionally couples to entry check circuit 70. A system controller (SC) entry output of entry check circuit 70 couples to tracking circuit 74 and a transition error output of entry check circuit 70 couples to error handler 72. ADC bus 30 additionally couples to tracking circuit 74 and a tracker-on output of tracking circuit 74 couples to transition monitor register 66. An entry error output of tracking circuit 74 couples to error handler 72. An MAE reset output of error handler 72 serves as the output from MAE 50 and couples to logic gate 48 (FIG. 1).

FIG. 5 shows logic equations defining the operation of domain identification block 62. Referring to FIGS. 4, 5, domain identification block 62 defines domains 56 (FIG. 3). When microprocessor 22 (FIG. 1) engages in a memory access, domain identification block 62 produces a current domain code on current access bus 64. The current domain code identifies the domain 56 (FIG. 3) to which the current memory access is being addressed. Domains 56 are defined through upper and lower address boundaries that are written to various domain registers (not shown).

As indicated in equation 76, if an access, whether a read or write, is directed toward domain 56 for system controller (SC) 52, the system controller's domain code is asserted on current address bus 64. The contents of domain boundary registers have no influence over the current domain output from domain identification circuit 62. Equation 78 indicates that accesses to addresses not in the system controller's domain 56 cause a code to be generated on current address bus 64 that is generated from the contents of a particular addressed domain register. Equation 80 indicates that domain boundaries may be defined by writing to various domain registers. However, these domain boundary definitions may only be defined from within system controller 52. Thus, the addresses for the domain registers themselves are desirably located in the system controller's domain 56 so that they can be accessed only by system controller 52 and not by an application 54 (FIG. 2).

FIG. 6 shows logic equations defining the operation of transition monitor register 66. Referring to FIGS. 4, 6, transition monitor register 66 identifies the domain associated with a consecutively previous memory access, relative to the current memory access. Transition monitor register 66 outputs a code identifying this previous domain.

Equation 82 indicates that the previous domain is set to the system controller's domain 56 when a hardware reset to microprocessor 22 (FIG. 1) occurs. This initializes the previous domain code so that no error is indicated in response to a reset. Equation 84 indicates that so long as the current domain is not the system controller's domain, the previous domain is set to the code exhibited by the current access bus 64 during the last access. Equation 86 indicates that when the currently accessed domain is the system controller's domain, the previous domain is not updated with the last current domain access until the tracker-on signal from tracking circuit 74 is true. The tracker-on signal becomes true after microprocessor 22 executes the instruction located at address 60 (FIG. 3). By delaying update of the previous domain code in this situation, an interrupt may occur prior to executing the instruction at address 60 without an error being indicated.

Figure 7:
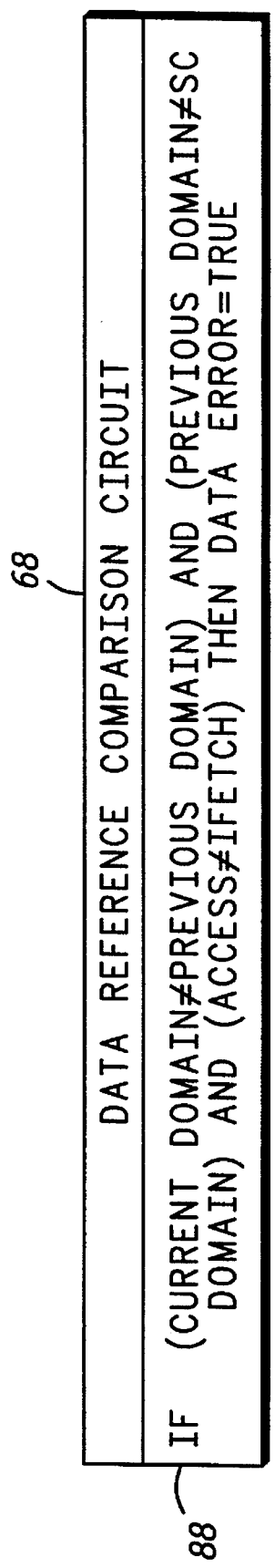
FIG. 7 shows a logic equation defining the operation of a data reference comparison circuit block of the memory access enforcer.

FIG. 7 shows a logic equation 88 defining the operation of data reference comparison circuit 68. Referring to FIGS. 4, 7, data reference comparison circuit 68 determines when domains for previous and current memory accesses do not correspond to each other. Equation 88 indicates that the data error is set true when three conditions occur simultaneously, specifically, (i) that the current domain does not match the previous domain, (ii) that the previous domain is not equal to the system controller's domain, and (iii) that the access is not to be an instruction fetch (IFETCH). Condition (ii) prevents the data error from being asserted when a previous access was in the system controller's domain. Thus, system controller 52 may access any data within memory 38 (FIG. 1) without causing a data error. However, if application 54 attempts to access data outside its own domain, a data error will be indicated. Thus, a data error is indicated only for data or I/O accesses and not for instruction accesses. Potential errors associated with instruction accesses are conveyed through entry error and transition error signals, discussed below.

Figure 8:
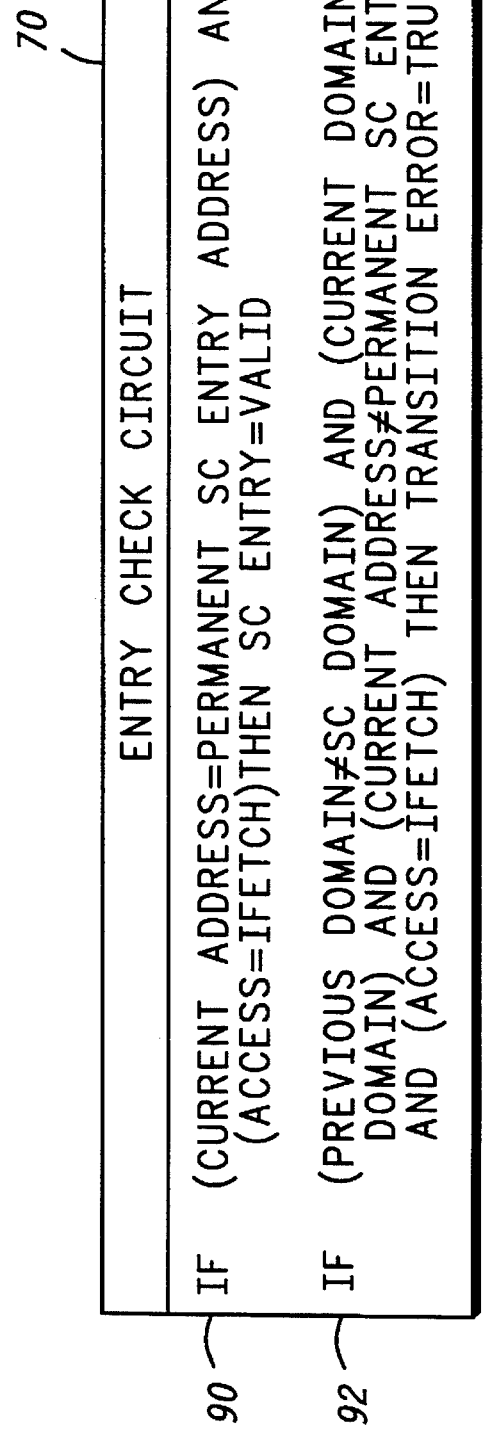
FIG. 8 shows logic equations defining the operation of an entry check circuit block of the memory access enforcer.

FIG. 8 shows logic equations defining the operation of entry check circuit 70. Referring to FIGS. 4, 8, entry check circuit 70 identifies program flow across a boundary between domains 56. With few exceptions, such inter-domain program flow is not permitted because it is inconsistent with isolated multiprocessing. The exceptions relate to system controller 52. Entry check circuit 70 determines when system controller program 52 is being properly initiated.

Equation 90 defines conditions representing proper initiation of system controller 52. When the current address on ADC bus 30 equals the permanent entry address 60 (FIG. 3) into system controller 52 and microprocessor 22 (FIG. 1) is performing an instruction fetch (IFETCH), entry check circuit 70 sets the SC entry output to indicate a valid entry. Otherwise, the SC entry is reset so as not to indicate a valid initiation of system controller 52.

Equation 92 defines conditions causing a transition error (i.e., improper inter-domain program flow) to be indicated. Entry check circuit 70 verifies that the access is an instruction fetch (IFETCH), that the previous domain does not equal the current domain, that the previous domain does not equal the system controller's domain and that the current address does not equal entry address 60 (FIG. 3).

Inter-domain program flow occurs when the domain of a previous memory access does not correspond to the domain of a current instruction fetch memory access. However, such inter-domain program flow is not improper when the previous domain is the system controller's domain. This allows program flow to exit system controller 52 to any address in any application 54. Due to the trusted nature of system controller 52, isolated processing will not be harmed. Nor is such inter-domain program flow improper when it represents a jump to the system controller's entry address 60. However, other attempted entry points into system controller 52 cause a transition error. The use of a single allowed entry point into system controller 52 is desirable for computer 20 because it eases the analysis required to assure a trusted status for system controller 52.

Figure 9:
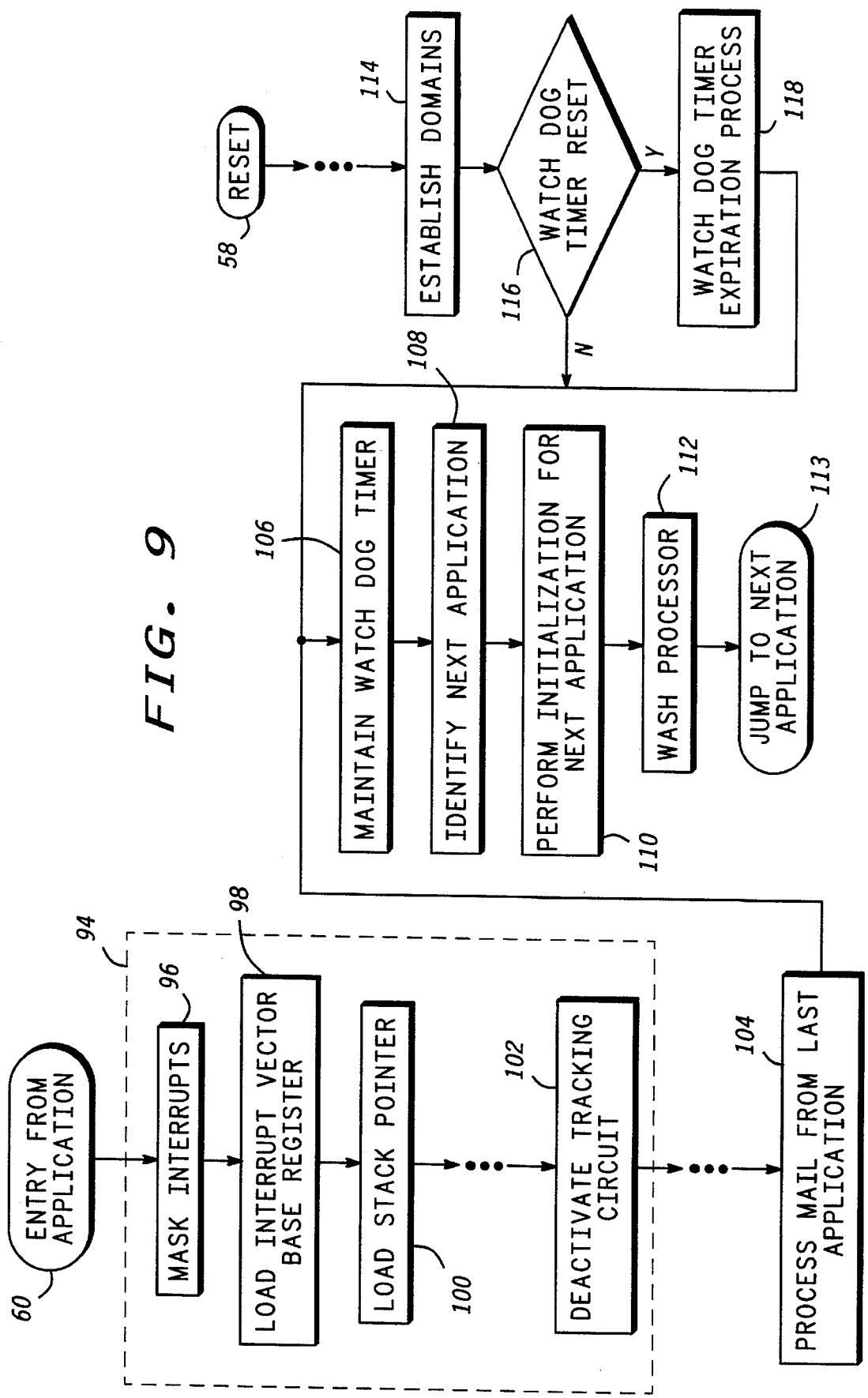
FIG. 9 is a flow chart of a system controller coroutine executed by the computer.

The preferred embodiment of the present invention relies upon cooperation between hardware and system controller program 52. Tracking circuit 74 verifies, external to microprocessor 22 (FIG. 1), that microprocessor 22 actually executes a set of entry instructions beginning at entry address 60 (FIG. 3). FIG. 9 is a flow chart of tasks, including the entry instructions, performed by system controller 52.

System controller program 52 (FIG. 9) may have two separate entry points. Entry to program 52 from application 54 desirably occurs at entry address 60 (FIG. 3). When system controller 52 is initiated at address 60, it attempts to perform a set of entry instructions 94. Entry instructions 94 begin at address 60 and desirably continue sequentially to the end of entry instructions 94. The first instruction of entry instructions 94 is task 96, masking interrupts. Thus, following task 96, no normal interrupts will influence program flow. However, non-maskable interrupts and various modes of operation for modern microprocessors might possibly still cause some alteration of program flow away from entry instructions 94. Thus, system controller 52 might possibly fail in its attempt to execute entry instructions 94.

After task 96, task 98 loads an interrupt vector base register. Such a register, internal to microprocessor 22, establishes an address base from which indirect addressing jumps may take place to vector program flow to interrupt handlers. This register is loaded with a value appropriate for system controller 52 and points within the domain of system controller 52. Next, task 100 loads a stack pointer (typically internal to microprocessor 22) that determines an address in memory 38 where a stack will be located for use by subsequent system controller operations. The stack pointer register is loaded with a value appropriate for system controller program 52 and points within the domain 56 of system controller 52.

After task 100, entry instructions 94 may include any number of additional instructions. Task 102 deactivates tracking circuit 74 and marks the end of entry instructions 94. Tracking circuit 74 may be deactivated by writing to a tracking circuit hardware control flag, as discussed below. At the end of entry instructions 94, microprocessor 22 is guaranteed to be in a known state, i.e., when other tasks performed by system controller 52 are executed, a guarantee can be made that all entry instructions 94 have been executed. This guarantee eases the analysis required to assure a trusted status for system controller 52.

The instructions included in entry instruction set 94 are desirably configured to execute sequentially, i.e., these instructions do not include conditional or unconditional jumps or branches. The sequential nature of entry instructions 94 simplifies the hardware implementation of tracking circuit 74, which verifies that microprocessor 22 actually executes entry instructions 94.

After task 102 and entry instructions 94, system controller 52 may perform any number of diverse tasks. For example, task 104 may process mail from the last-executed application 54. Mail may be processed by reading specific memory locations in the domain 56 of this application 54 and treating the data contained therein as an instruction to mail data to another application. The mailing instruction may be verified by system controller 52, and the mailing instruction may specify that data be read from specific addresses in one domain and written in another application's domain 56.

After task 104, task 106 may maintain watch dog timer 46 (FIG. 1) by pushing an alarm time further into the future. Timer 46 is desirably configured to have an address in domain 56 of system controller 52, and timer 46 may be maintained by writing data to this address. Next, task 108 may identify next application 54 to which program control should be passed. As discussed above, this identification may be determined in response to a mail transfer. After task 108, task 110 performs any needed initialization for this next application. Desirably such initialization is minor so that context switching between applications 54 may take place quickly, so that system controller 52 may be kept as simple as possible to ease the analysis requirements of a trusted status, and so that system controller 52 may remain as independent as possible of applications 54. After task 110, task 112 may wash microprocessor 22 by clearing all microprocessor registers, stack pointers, interrupt vector base registers etc., so that system controller data are not inadvertently passed to an application 54. After task 112, program control jumps (block 113) to the application 54 identified above in task 108. That application 54 will then fully restore the state of processor 22 as it existed prior to the last transfer of control to from that application 54 to system controller 52. When that application 54 completes its job, it passes control back to system controller 52 at address 60.

A reset entry into system controller 52 may be accomplished through reset address 58 (FIG. 3). The reset entry results from power on, a watch dog timer alarm or an MAE error. Due to the permanent definition of the system controller's domain 56 (FIG. 3), reset entry 58 is guaranteed to reside within the system controller's domain. Upon a reset, system controller 52 may do any number of initialization tasks which are conventional in the art of computer systems and system controller 52 may also perform task 114 to program domains 56 for applications 54. Domains 56 may be programmed by writing to domain registers, as indicated in equation 80 (FIG. 5).

After task 114, system controller 52 may perform query task 116 to determine which type of reset occurred, e.g., task 116 may determine whether a watch dog timer reset occurred, and if so perform watch dog timer expiration process 118 to take appropriate action. After task 118 or when task 116 determines that the reset was not caused by a watch dog timer alarm, program control may proceed to task 106, discussed above, where preparations are made for jumping to application 54.

FIG. 10 shows logic equations defining the operation of tracking circuit 74. Referring to FIGS. 4, 10, tracking circuit 74 verifies, from external to microprocessor 22, that microprocessor 22 actually executes entry instructions 94 (FIG. 9). Tracking circuit 74 operates in an activated state and a deactivated state. It is normally in the deactivated state. As indicated in equation 120, tracking circuit 74 enters its activated state when the SC valid signal from entry check circuit 70 becomes true. As discussed above, this signal becomes true when inter-domain program flow proceeds from an application 54 to entry address 60 for system controller 52. The activated state is indicated by the tracker-on signal being set true.

Equation 122 defines three conditions signifying an entry error, occurring when microprocessor 22 fails to follow entry instructions 94 (FIG. 9). An entry error is asserted when tracking circuit 74 has been activated, when a memory access is an instruction fetch (IFETCH) and when an instruction pipeline (IPIPE) is flushed. The IPIPE signal from microprocessor 22 signals instruction pipeline flushing, and this indicates non-sequential program flow.

Equation 124 defines how tracking circuit 74 may be deactivated. As discussed above in connection with task 102 (FIG. 9), tracking circuit 74 may be deactivated by writing to a specific hardware tracking circuit control flag. Desirably, this control flag has an address positioned in the domain 56 of system controller 52 so that applications 54 may not access it.

FIG. 11 shows a logic equation 126 defining the operation of error handler 72. Referring to FIGS. 4, 11, the MAE error signal is set true when any of the data error, entry error or transition error signals are set true. As discussed above, when the MAE error signal is set true, computer 20 is reset in the preferred embodiment. Nothing prevents other embodiments from taking other actions when memory access enforcer error is detected.

In summary, the present invention provides an improved isolated multiprocessing computer architecture and method. The architecture and method may be implemented using only a single microprocessor. This single microprocessor may take advantage of a range of interrupting and other advanced capabilities. The use of a single microprocessor for isolated multiprocessing reduces development and manufacturing costs. In addition, development costs are further reduced by easing the task of providing assurances that the computer system is operating as intended. The task of analyzing the system to assure its satisfactory operation is eased due to the isolation of independent application programs. The independent application programs are sufficiently isolated so that they may be designed and written using entirely different programming languages, including ADA. A system controller program is thoroughly analyzed, but this job is not difficult due to the simplicity of the system controller program, its restricted entry points, and its guaranteed execution of entry instructions.

The present invention has been described above with reference to preferred embodiments. However, those skilled in the art will recognize that changes and modifications may be made in these preferred embodiments without departing from the scope of the present invention. For example, while a specific architecture directed toward a particular microprocessor chip has been described herein, those skilled in the art may adapt the preferred embodiment to other architectures. These and other changes and modifications which are obvious to those skilled in the art are intended to be included within the scope of the present invention.

What is claimed is:

1. A computer for performing isolated multiprocessing operations, said computer comprising:

a memory allocated to a plurality of programs, each of said plurality of programs corresponding to one of a plurality of address domains within said memory, said plurality of programs including a system controller program and at least one application program;

a processor configured to access said memory at addresses specified by said processor and to execute instructions stored in said memory, said instructions including a set of entry instructions which said processor executes upon initiation of said system controller program and other instructions following said set of entry instructions; and a tracking circuit, coupled to said processor, said tracking circuit being configured to verify only that said processor actually executes said set of entry instructions.

2. A computer as claimed in claim 1, additionally comprising an entry check circuit, having an input coupled to said processor and having an output coupled to said tracking circuit, for determining when an initiation of said system controller program occurs, said initiation of said system controller program causing said tracking circuit to activate.

3. A computer as claimed in claim 1, wherein said set of entry instructions are configured to include an instruction that, when executed by said processor, deactivates said tracking circuit.

4. A computer as claimed in claim 1, wherein said set of entry instructions are configured so that, when executed by said processor, said processor performs instruction fetch memory accesses only from sequential memory locations.

5. A computer as claimed in claim 1, additionally comprising means, coupled to said tracking circuit, for resetting said processor when said tracking circuit fails to verify that said processor actually executes said set of entry instructions.

6. A computer as claimed in claim 1, wherein said computer additionally comprises:
- a current access bus, coupled to said processor, for identifying a first domain of said plurality of domains associated with a current memory access by said processor;
- a previous access means, coupled an element chosen from the group consisting of said processor and said current access bus, for identifying a second domain of said plurality of domains associated with a previous memory access by said processor; and
- a comparison circuit, coupled to said current access bus and said previous access means, and current memory accesses do not correspond to each other.

7. A computer as claimed in claim 6, wherein said comparison circuit comprises:
- means for indicating an error when said first and second domains for said previous and current memory accesses do not correspond to each other; and
- means, coupled to said indicating means, for preventing an indication of said error when said previous memory access is from a third domain associated with said system controller program.

8. A method for isolated multiprocessing in a computer architecture having a processor coupled to a memory, said method comprising steps of:
- associating a plurality of memory address domains with a corresponding plurality of programs, said corresponding plurality of programs including a system controller program and at least one application program;
- attempting, at said processor, to execute a set of entry instructions upon initiating said system controller program and other instructions following said set of entry instructions;
- verifying, external to said processor, only that said processor actually executes said set of entry instructions; and
- indicating an error when said verifying step determines that said processor does not actually execute said set of entry instructions.

9. A method as claimed in claim 8, additionally comprising steps of;
- determining, external to said processor, when initiation of said system controller program occurs; and
- activating said verifying step when said determining step determines that initiation of said system controller coroutine program occurs.

10. A method as claimed in claim 8, additionally comprising a step of providing, in said set of entry instructions, an instruction that, when executed by said processor, disables said verifying step.

11. A method as claimed in claim 8, additionally comprising a step of configuring said set of entry instructions to sequentially access locations of said memory.

12. A method as claimed in claim 8, additionally comprising a step of resetting said processor when said error is indicated.

13. A method as claimed in claim 8, additionally comprising steps of:
- identifying a first domain and a second domain of said plurality of memory address domains, said first and second domains associated with a previous memory access and a current memory access, respectively, wherein said previous and current memory accesses are consecutive memory accesses by said processor;
- determining whether said current memory access is from a predetermined address; and
- indicating said error when said first and second domains do not correspond to each other and said current memory access is not from said predetermined address.

14. A method as claimed in claim 13, additionally comprising a step of refraining from indicating said error when said previous memory access is from a one of said plurality of memory address domains that is associated with said system controller program.

15. A method for isolated multiprocessing in a computer architecture having a processor coupled to a memory, said method comprising steps of:
- associating uniquely a plurality of memory address domains with a plurality of coroutine programs, wherein said plurality of coroutine programs include a system controller coroutine program and at least one application coroutine program;
- identifying a first domain and a second domain of said plurality of memory address domains that are associated with a previous memory access and a current memory access by said processor, respectively, wherein said previous memory access and said current memory access occur consecutively; and
- indicating an error when said first and second domains for said consecutive previous and current memory accesses do not correspond to each other.

16. A method as claimed in claim 15, further comprising steps of:
- attempting, at said processor, to execute a set of entry instructions upon initiating said system controller coroutine program;
- detecting external to said processor, whether said processor actually executes said set of entry instrustions; and
- indicating an error when said detecting step determines that said processor does not actually execute said set of entry instructions.

17. A method as claimed in claim 16, additionally comprising steps of:
- determining, external to said processor, when initiation of said system controller coroutine program occurs; and
- activating said detecting step when said determining step determines that initiation of said system controller coroutine program occurs.

18. A method as claimed in claim 16, additionally comprising a step of including, in said set of entry instructions, an instruction that, when executed by said processor, disables said detecting step.

19. A method as claimed in claim 16, additionally comprising a step of configuring said set of entry instructions to sequentially access locations of said memory.

20. A method as claimed in claim 15, additionally comprising a step of resetting said processor when said error is indicated.

21. A method as claimed in claim 15, additionally comprising steps of:
- determining when said current memory access is from a predetermined address; and
- refraining from indicating said error when said current memory access is from said predetermined address.

22. A method as claimed in claim 21, additionally comprising a step of permanently establishing said predetermined address.

23. A method as claimed in claim 21, additionally comprising steps of:
    attempting, at said processor, to execute a set of instructions stored in said memory beginning at said predetermined address;
    verifying, in response to said determining step, that said processor actually executes said set of instructions; and
    indicating an error when said verifying step determines that said processor does not actually execute said set of instructions.

24. A method as claimed in claim 21, wherein:
    said determining step determines when said current memory access is an instruction fetch from said predetermined address; and
    said refraining step refrains from indicating said error when said current memory access is said instruction fetch from said predetermined address.

25. A method as claimed in claim 15, wherein:
    said plurality of coroutine programs include a system controller coroutine program and at least one application coroutine program; and
    said method additionally comprises the step of refraining from indicating said error when said previous memory access is from a one of said plurality of memory address domains that is associated with said system controller coroutine program.

26. A method as claimed in claim 15, wherein at least one of said plurality of coroutine programs comprises code written in ADA.

* * * * *

UNITED STATES PATENT AND TRADEMARK OFFICE
CERTIFICATE OF CORRECTION

PATENT NO. : 5,551,051
DATED : August 27, 1996
INVENTOR(S) : Lee Silverthorn et al.

It is certified that error appears in the above-indentified patent and that said Letters Patent is hereby corrected as shown below:

```
Title page item [54],
In the title change "VERIFYNG to --VERIFYING--.

Column 11, line 16, claim 6, following "means"
insert --for determing when said first and second
domains for said previous and--.
```

Signed and Sealed this

Twenty-second Day of July, 1997

Attest:

BRUCE LEHMAN

*Attesting Officer*   *Commissioner of Patents and Trademarks*